United States Patent
Okada

(10) Patent No.: US 8,680,470 B2
(45) Date of Patent: Mar. 25, 2014

(54) RADIOGRAPHIC IMAGING DEVICE, COMPUTER-READABLE MEDIUM STORING PROGRAM FOR CONTROLLING RADIOGRAPHIC IMAGING DEVICE, AND METHOD FOR CONTROLLING RADIOGRAPHIC IMAGING DEVICE

(75) Inventor: Yoshihiro Okada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 185 days.

(21) Appl. No.: 13/363,386

(22) Filed: Feb. 1, 2012

(65) Prior Publication Data

US 2012/0193546 A1    Aug. 2, 2012

(30) Foreign Application Priority Data

Feb. 1, 2011    (JP) ................................. 2011-020237

(51) Int. Cl.
*G01T 1/24*      (2006.01)

(52) U.S. Cl.
USPC .................................................... 250/370.08

(58) Field of Classification Search
USPC .................................................... 250/370.08
See application file for complete search history.

(56) References Cited

U.S. PATENT DOCUMENTS 6,185,274 B1 *   2/2001   Kinno et al. .................. 378/98.8
2009/0272909 A1 *   11/2009   Takenaka et al. ........ 250/370.09

FOREIGN PATENT DOCUMENTS

| JP | 2001-056382 A | 2/2001 |
|---|---|---|
| JP | 2006-101396 A | 4/2006 |
| JP | 2007-108082 A | 4/2007 |

* cited by examiner

*Primary Examiner* — Marcus Taningco
(74) *Attorney, Agent, or Firm* — SOLARIS Intellectual Property Group, PLLC

(57) ABSTRACT

The present invention provides a radiographic imaging device, a computer-readable medium storing a program for controlling a radiographic imaging device, and a method for controlling a radiographic imaging device, that may suppress feed-through without narrowing a dynamic range. Namely, a control section outputs control signals via scan lines to gates of TFT switches to perform control in such a way that the timing when a TFT switch n−1 of a pixel n−1 is switched to an OFF state and the timing when a TFT switch n of a pixel n is switched to an ON state become simultaneous timings, or timings that can be regarded substantially simultaneous even though the time period in which the TFT switch n is in an ON state and part of the time period in which the TFT switch n−1 is in an ON state overlap.

8 Claims, 9 Drawing Sheets

RADIOGRAPHIC IMAGING DEVICE, COMPUTER-READABLE MEDIUM STORING PROGRAM FOR CONTROLLING RADIOGRAPHIC IMAGING DEVICE, AND METHOD FOR CONTROLLING RADIOGRAPHIC IMAGING DEVICE

CROSS-REFERENCE TO RELATED APPLICATION

This application claims priority under 35 USC 119 from Japanese Patent Application No. 2011-020237 filed on Feb. 1, 2011, the disclosure of which is incorporated by reference herein.

BACKGROUND OF THE INVENTION

1. Field of the Invention

The present invention pertains to a radiographic imaging device, a computer-readable medium storing a program for controlling a radiographic imaging device, and a method for controlling radiographic imaging device. The present invention particularly relates to a radiographic imaging device, a computer-readable medium storing a program for radiographic imaging device, and a method for controlling radiographic imaging device, that images radiographic images for medical purposes.

2. Description of the Related Art

Generally, radiographic imaging devices that perform radiographic imaging for medical diagnoses have been known. The radiographic imaging devices image radiographic images by detecting radiation that has been irradiated from a radiation irradiation device and has passed through a subject. The radiographic imaging devices perform image of radiographic images by collecting and reading out charges that have been generated in response to the irradiated radiation.

Such conventional radiographic imaging devices are equipped with a radiation detection element that detects the radiation. Examples of the radiation detection element include a radiation detection element including photoelectric conversion elements, switching elements, and amplifier circuits, that are arrayed two-dimensionally. The photoelectric conversion elements generate charges as a result of radiation, or light into which radiation has been converted, being irradiated or illuminated to the photoelectric conversion elements. The switching elements read-out the charges that have been generated in the photoelectric conversion elements and output electric signals corresponding to the charges. The amplifier circuits includes integrator circuits that accumulate the charges corresponding to the electric signals that have been outputted from the switching elements and output electric signals in which the accumulated charges have been amplified.

The radiation detection element has a configuration where, like a TFT active matrix substrate, plural gate lines (scan lines) and plural signal lines are arranged intersecting each other, and therefore, may cause a parasitic capacitance. The gate lines (scan lines) switch the switching elements ON and OFF. The signal lines transmit charges from pixels whose switching elements have been switched ON. Consequently, at the time when the switching elements are ON and at the time when the switching elements are OFF, the size of the voltage applied to the parasitic capacitance existing in the positions where the signal lines intersect the scan lines connected to those switching elements changes. Due thereto, inductive charges occur in the parasitic capacitance, and the inductive charges may be superimposed on the charges (signal charges for a radiographic image) transmitted through the signal lines, as a noise component called feed through. The charge quantities held and accumulated in individual pixels in a radiation detection panel are minute, and the order of the feed-through are the same as the order of the signal charges transmitted through the signal lines. For this reason, the feed-through component may bring a measurable affects. Particularly in the case of imaging moving-image, the dose per imaging is made smaller than in imaging still-image. Accordingly, the charge quantities held and accumulated in the pixels become even small and the effect of the feed-through component becomes larger.

Examples of technologies to remove (cancel) the feed-through are described in Japanese Patent Application Laid-Open (JP-A) No. 2001-56382, JP-A No. 2006-101396, and JP-A No. 2007-108082.

JP-A No. 2001-56382 describes a technology that cancels feed-through by dedicated adjusting sections that are separately arranged. Further, in JP-A No. 2006-01396, there is described a technology that cancels the feed-through. This technology includes charge amp as a differential amp for performing correlated double sampling and, within the charge signals integration time period in the amp, outputs to each gate line a voltage that is the inverse of the voltage of control signals that switches the switching elements to an ON state. Due thereto, this technology cancels the feed-through component with a control signals for switching the switching elements ON, and control signals for switching the gates OFF within one integration time period. Further, JP-A No. 2007-108082 discloses a technology where selection switches are disposed on the signal lines, and where the feed-through component is canceled within one integration time period by the ON/OFF operation of the selection-use switches and the gate lines.

However, in the technology described in JP-A No. 2001-56382, the dedicated adjusting sections are necessary. Accordingly, in this technology, dedicated circuits and so forth are necessary for the dedicated adjusting sections. Further, in this technology, in order to avoid the superimposition of sensitivity information on the dedicated adjusting sections, sensor capacitances cannot be added, and the capacitances end up differing. Further still, it is necessary for the dedicated adjusting sections to be placed in neighboring portions of the switching elements (pixels), so in a large-area sensor substrate, the capacitances end up varying in-plane.

On the other hand, in the technology described in JP-A No. 2006-101396, electric signals where the feed-through component has been superimposed on the signal charges are inputted to the amplifier circuit that accumulates the charges. Consequently, in this technology, the electric signals end up not fitting in the range amplifiable by the integrator circuits (amps) of the amplifier circuits, whereby the dynamic range becomes narrower.

Further, in the technology described in JP-A No. 2007-108082, the accumulation of the charges in the integrator circuits starts from the time when the selection switches have been switched ON. For this reason, in this technology, the dynamic range becomes narrower because of switching noise resulting from the selection switches, and switching noise resulting from the gates of the TFTs that are being ON.

SUMMARY OF THE INVENTION

The present invention provides a radiographic imaging device, a computer-readable medium storing a program for controlling a radiographic imaging device, and a method for controlling radiographic imaging device, that may suppress feed-through without narrowing a dynamic range.

A first aspect of the invention is a radiographic imaging device including: a plurality of pixels arranged in a matrix, each pixel including a photoelectric conversion element that generates charges due to irradiation of radiation, and a switching element that reads out the charges, and outputs electric signals that correspond to the generated charges to a signal line; amplifying sections that accumulate charges corresponding to the electric signals, and outputs amplified electric signals in which the charges that have been accumulated are amplified; and a control section that outputs, to a control line, control signals that control time periods in which the electric signals are outputted from the switching elements, wherein the control section outputs the control signals such that a first time period, in which the switching element of a first pixel is driven to output the electric signals, and part of a second time period, in which the switching element of a second pixel driven after the switching element of the first pixel outputs the electric signals, overlap, or wherein the control section outputs the control signals such that an end of the first time period and the start of a second time period overlaps.

In the present invention, the control section outputs the control signals as described above, whereby signals with the same level as and which is the inverse of the feed-through component can be generated when the first time period in which the switching element of the first pixel is driven to output the electric signals to the signal line ends. For this reason, the first aspect of the invention may use that signals to cancel the feed-through component.

Consequently, the first aspect of the invention may suppress feed-through without disposing dedicated adjusting sections or the like, and without narrowing dynamic range.

In a second aspect of the invention, in the first aspect, may further include a reset section that resets the charges that have been accumulated in the amplifying section, and the control section may output the control signals such that the first time period of the first pixel ends and the second time period of the second pixel starts, after the reset section has reset the charges of the first pixel that has been accumulated in the amplifying section.

In a third aspect of the invention, in the first aspect, the first pixel and the second pixel may be adjacent pixels.

According to the third aspect of the present invention, correction becomes possible in the neighborhoods of target pixels in which the cancellation of the feed-through component is desired. Consequently, the third aspect of the invention may appropriately perform suppression of the feed-through component without being affected by in-plane variations.

In a fourth aspect of the invention, in the first aspect, when Ron denotes the ON-resistance of the switching elements, Cpd denotes the pixel capacitance of the pixels including the switching elements, Rg denotes the line resistance of the control line, and Cg denotes the line capacitance of the control line, the relationship of Cg×Rg<Cpd×Ron may be satisfied.

According to the fourth aspect, the delay time of the control line becomes sufficiently smaller than the delay time of the switching elements. For this reason, the fourth aspect of the invention may complete the operation of canceling the feed-through component in a short time period of time compared to the output time period of the electric signals.

In a fifth aspect of the invention, in the first aspect, when Ron denotes the ON-resistance of the switching elements, Cpd denotes the pixel capacitance of the pixels including the switching elements, Rg denotes the line resistance of the control line, and Cg denotes the line capacitance of the control line, the control section may output the control signals such that a time period T in which the first time period and part of the second time period overlaps satisfies the relationship of Cg×Rg<T<Cpd×Ron.

A sixth aspect of the invention is a radiographic imaging device including: a plurality of pixels arranged in a matrix, each pixel including, a photoelectric conversion element that generates charges due to irradiation of radiation, and a switching element that reads out the charges, and outputs electric signals that correspond to the generated charges to a signal line; amplifying sections that accumulate charges corresponding to the electric signals, and outputs amplified electric signals in which the charges that have been accumulated are amplified; and a control section that outputs, to a control line, control signals that control time periods in which the electric signals are outputted from the switching elements, wherein the control section outputs the control signals such that a first generation period predetermined based on a charge amount of the feed-through noise generated due to switching OFF the switching element of a first pixel, and a second generation period predetermined based on a charge amount of the feed-through noise generated due to switching ON the switching element of a second pixel, driven after the switching element of the first pixel, overlaps.

In a seventh aspect of the invention, in the sixth aspect, the control section may output the control signals such that the second generation period is included in the first generation period.

An eighth aspect of the invention is a computer-readable medium storing a program for causing a computer to execute a process for controlling a radiographic imaging device including, a plurality of pixels arranged in a matrix, each pixel including a photoelectric conversion element that generates charges due to irradiation of radiation, and a switching element that read-out the charges and outputs electric signals corresponding to the charges to a signal line, amplifying sections that accumulate the charges corresponding to the electric signals and outputs amplified electric signals in which the charges that have been accumulated in the amplifying section are amplified, and a control line in which flows control signals that control time periods in which the electric signals are outputted from the switching elements, the processing including: outputting the control signals such that a first time period, in which the switching element of a first pixel is driven to output the electric signals, and part of a second time period, in which the switching element of a second pixel driven after the switching element of the first pixel outputs the electric signals, overlap, or outputting the control signals such that the end of the first time period and the start of the second time period overlap.

A ninth aspect of the invention is a method for controlling a radiographic imaging device including, a plurality of pixels arranged in a matrix, each pixel including a photoelectric conversion element that generates charges due to irradiation of radiation, and a switching element that read-out the charges and outputs electric signals corresponding to the charges to a signal line, amplifying sections that accumulate the charges corresponding to the electric signals and outputs amplified electric signals in which the charges that have been accumulated in the amplifying section are amplified, and a control line in which flows control signals that control time periods in which the electric signals are outputted from the switching elements, the method including: outputting the control signals such that a first time period, in which the switching element of a first pixel is driven to output the electric signals, and part of a second time period, in which the switching element of a second pixel driven after the switching element of the first pixel outputs the electric signals, overlap, or outputting the control signals such that the end of the first time period and the start of the second time period overlap.

As described above, according to the above-described aspects, the present invention may suppress feed-through without narrowing a dynamic range.

BRIEF DESCRIPTION OF THE DRAWINGS

Exemplary embodiments of the present invention will be described in detail based on the following figures, wherein.

DETAILED DESCRIPTION OF THE INVENTION

Exemplary embodiments of the present invention will be described below with reference to the drawings.

First Exemplary Embodiment

Figure 1:
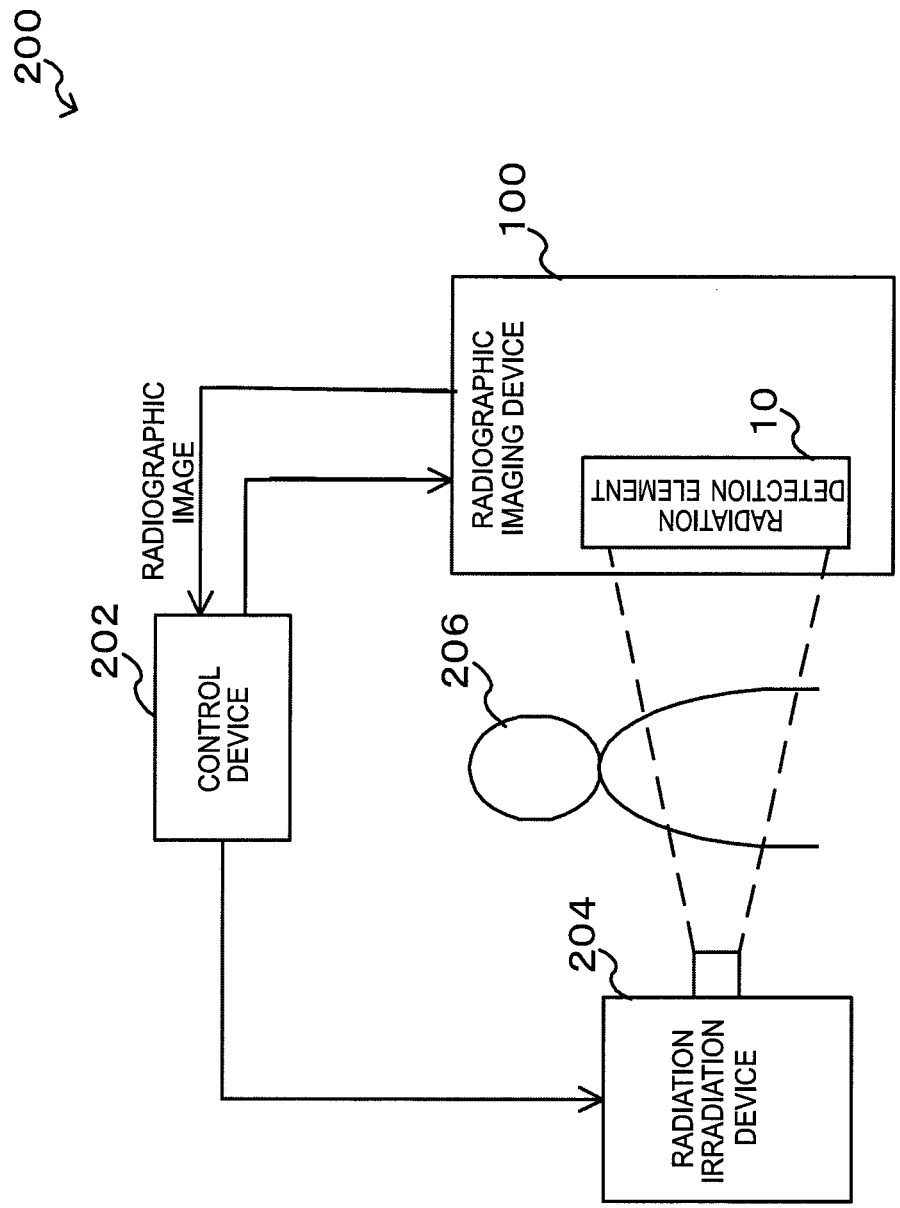
FIG. 1 is a schematic configuration of a radiographic imaging system according to a first exemplary embodiment.

First, the schematic configuration of a radiographic imaging system using a radiographic imaging device of the first exemplary embodiment will be described. FIG. 1 is a schematic configuration diagram of an example of a radiographic imaging system 200 of the first exemplary embodiment.

The radiographic imaging system 200 is configured to include a radiation irradiation device 204, a radiographic imaging device 100, and a control device 202. The radiation irradiation device 204 irradiates radiation (e.g., X-rays) to a subject 206. The radiographic imaging device 100 is equipped with a radiation detection element 10 that detects the radiation that has been irradiated from the radiation irradiation device 204 and has passed through the subject 206. The control device 202 instructs the image of a radiographic image and acquires a radiographic image from the radiographic imaging device 100. At a timing based on the control of the control device 202, the radiation irradiation device 204 irradiates the radiation to the subject 206 who is positioned in an imaging position. The radiation that carries image information as a result of passing through the subject 206 is irradiates to the radiographic imaging device 100.

Next, the schematic configuration of the radiographic imaging device 100 of the present exemplary embodiment will be described. In the present exemplary embodiment, a case where the present invention is applied to an indirect-conversion-type of the radiation detection element 10 that first converts radiation such as X-rays into light and then converts the light into charges, will be described. In the present exemplary embodiment, the radiographic imaging device 100 is configured to include the indirect-conversion-type of the radiation detection element 10. A scintillator that converts radiation into light is omitted from FIG. 2.

In the radiation detection element 10, pixels 20 configured to include sensor portions 103 and TFT switches 4 that are switching elements are plurally arranged in a matrix. The sensor portions 103 receive light, generate charges, and accumulate the generated charges. The TFT switches 4 are switching elements for reading out the charges that have been accumulated in the sensor portions 103. In the present exemplary embodiment, the sensor portions 103 generate the charges as a result of the light into which the radiation has been converted by the scintillator being illuminated to the sensor portions 103.

Figure 2:
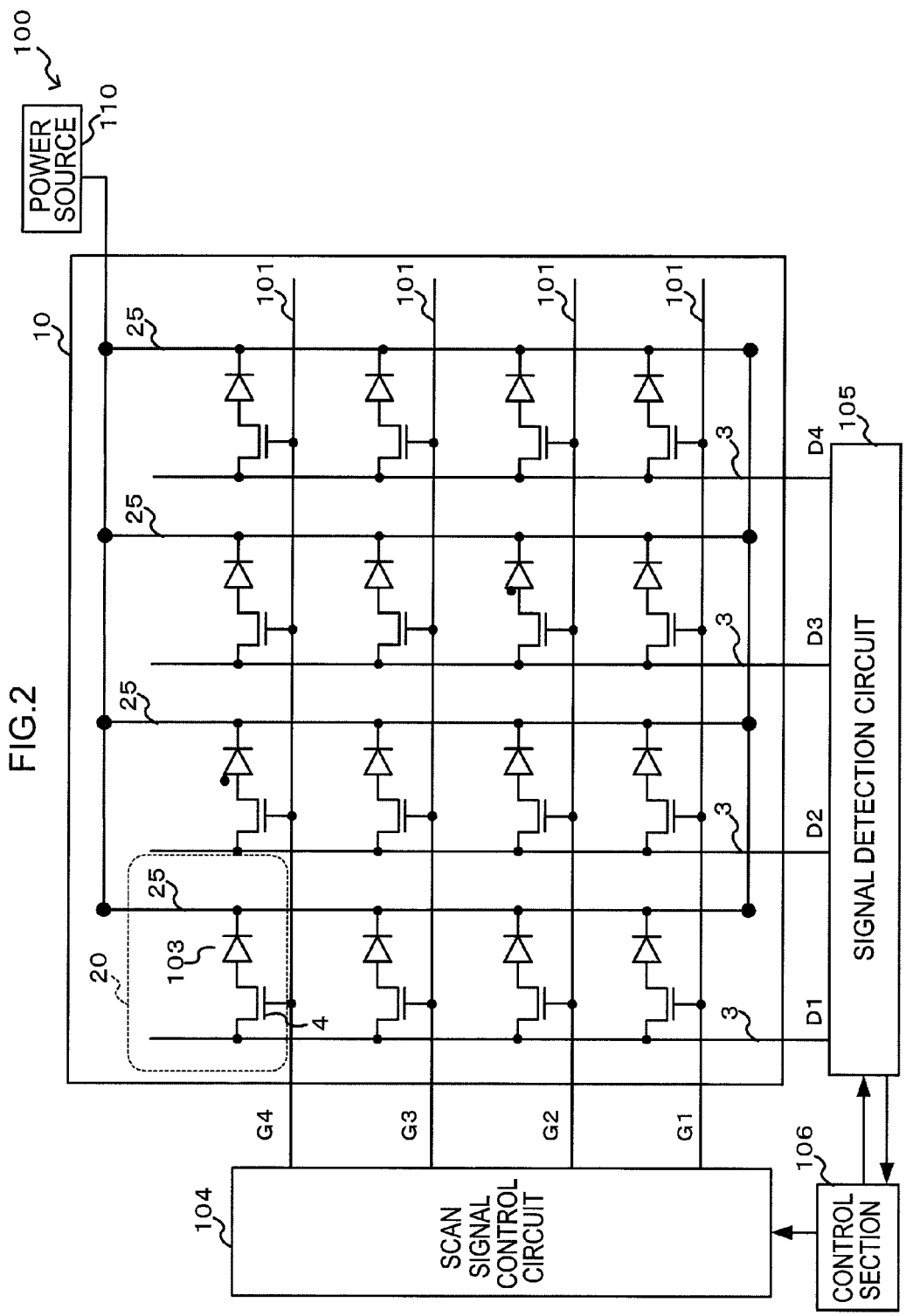
FIG. 2 is configuration diagram showing the overall configuration of a radiographic imaging device according to the first exemplary embodiment.

The pixels 20 are plurally arranged in a matrix in one direction (scan lines 101 direction in FIG. 2; this will be called a "row direction" below) and an intersecting direction (signal lines 3 direction in FIG. 2; this direction will be called a "column direction" below) with respect to the row direction. In FIG. 2, the array of the pixels 20 is shown in a simplified way. However, in actuality, the pixels 20 are arranged in such a way that there are, for example, 1024 pixels×1024 pixels in the row direction and the column direction.

Figure 3:
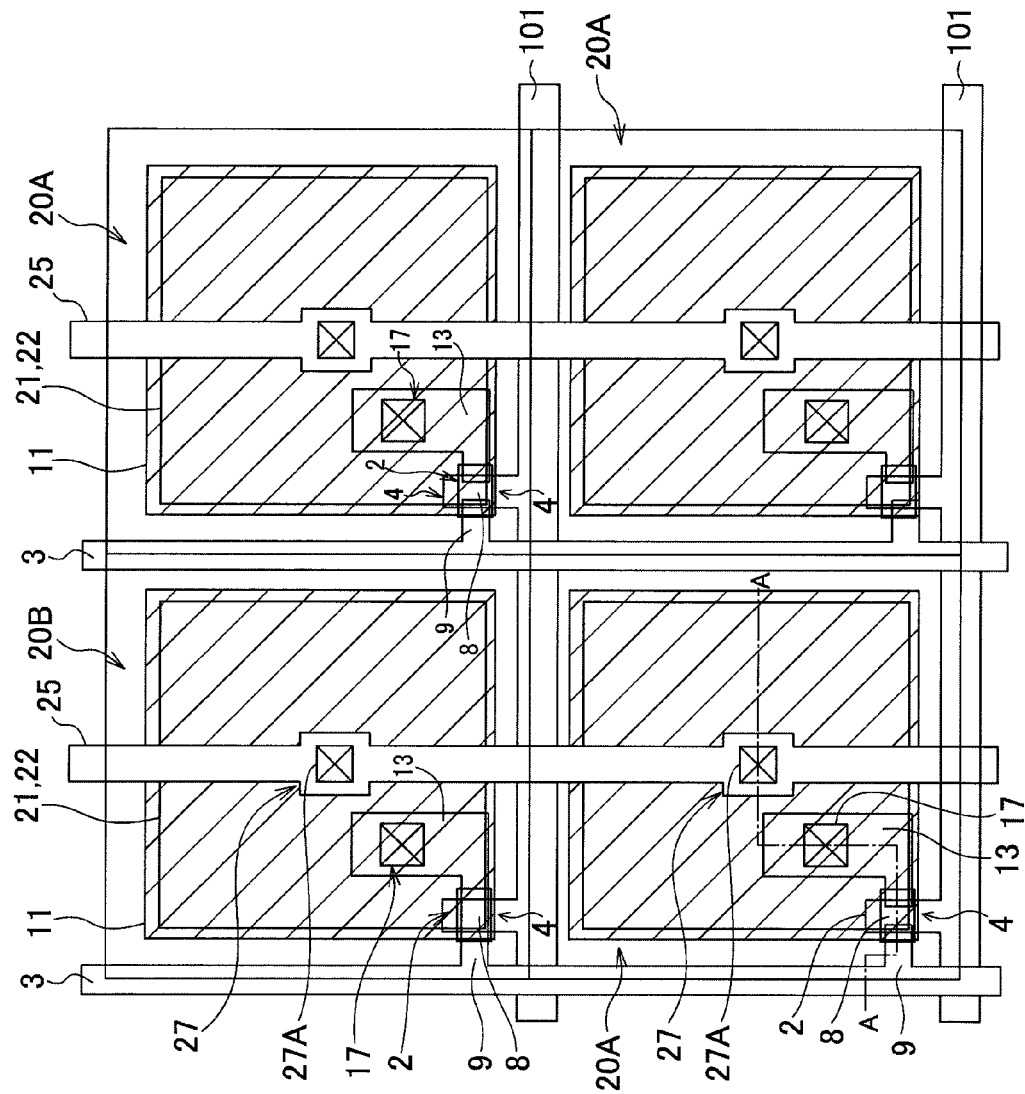
FIG. 3 is a plan view showing the configuration of a radiation detection element according to the first exemplary embodiment.

Further, in the radiation detection element 10, plural scan lines 101 that are control lines and plural signal lines 3 are disposed intersecting each other on a substrate 1 (see FIG. 3). The scan lines 101 switch the TFT switches 4 ON and OFF. The signal lines 3 read out the charges that have been accumulated in the sensor portions 103. In the present exemplary embodiment, the signal lines 3 are disposed so that there is one signal line each for each pixel string in the one direction, and the scan lines 101 are disposed so that there is one scan line each for each pixel string in the intersecting direction. For example, in a case where the pixels 20 are arranged in such a way that there are 1024 pixels×1024 pixels in the row direction and the column direction, the signal lines 3 and the scan lines 101 are disposed in such a way that there are 1024 of each.

Moreover, in the radiation detection element 10, common electrode lines 25 are disposed in parallel to each of the signal lines 3. One ends of the common electrode lines 25 are connected in parallel, and other ends of the common electrode lines 25 are connected to a power source 110 that supplies a predetermined bias voltage. The sensor portions 103 are connected to the common electrode lines 25, and the bias voltage is applied to the sensor portions 103 via the common electrode lines 25.

In the scan lines 101, control signals for switching the TFT switches 4 flow. The TFT switches 4 are switched (ON and OFF) as a result of the control signals flowing in the scan lines 101.

In the signal lines 3, electric signals corresponding to the charges that have been accumulated in the pixels 20 flow, when the TFT switches 4 of the pixels 20 are switched ON. More specifically, in the signal lines 3, electric signals corresponding to the charge quantities that have been accumulated flow, as a result of any of the TFT switches 4 of the pixels 20 connected to those signal lines 3 being switched ON.

A signal detection circuit 105 that detects the electric signals that have flowed out to the signal lines 3 is connected to the signal lines 3. Further, a scan signal control circuit 104 that outputs the control signals for switching the TFT switches 4 ON and OFF to the scan lines 101 is connected to the scan lines 101. In FIG. 2, the signal detection circuit 105 and the scan signal control circuit 104 are shown in a simplified way such that there is one of each. However, for example, the signal detection circuit 105 and the scan signal control circuit 104 are each plurally disposed, and a predetermined number (e.g., 256) of the signal lines 3 or the scan lines 101 are connected to each of the signal detection circuits 105 or the scan signal control circuits 104. For example, in a case where the signal lines 3 and the scan lines 101 are disposed in such a way that there are 1024 of each, four of the scan signal control circuits 104 are disposed and the scan lines 101 are connected to the scan signal control circuits 104 in such a way that 256 each of the scan lines 101 are connected to each of those four scan signal control circuits 104. Further, in such a case four of the signal detection circuits 105 are also disposed and the signal lines 3 are connected to the signal detection circuits 105 in such a way that 256 each of the signal lines 3 are connected to each of those four signal detection circuits 105.

The signal detection circuit 105 has, for each of the signal lines 3, a built-in amplifier circuit (amplifier circuit 50; see FIG. 5) that amplifies the inputted electric signal. The signal detection circuit 105 amplifies, with the amplifier circuits, the electric signals inputted from the signal lines 3 and converts, with an analog-to-digital converter (ADC), the amplified electric signals into digital signals.

A control section 106 is connected to the signal detection circuit 105 and the scan signal control circuit 104. The control section 106 executes predetermined process, such as noise removal, with respect to the digital signals into which the electric signals have been converted in the signal detection circuit 105. Along with this, the control section 106 outputs control signals indicating signal detection timing with respect to the signal detection circuit 105, and outputs a control signals indicating scan signals output timing with respect to the scan signal control circuit 104.

The control section 106 of the present exemplary embodiment is configured by a microcomputer, and is equipped with a central processing unit (CPU), a ROM, a RAM, and a nonvolatile storage section such as a flash memory. The control section 106 generates, on the basis of the electric signals representing the charge information of the pixels 20 for radiation detection that have been inputted from the signal detection circuit 105, an image represented by the radiation that has been irradiated.

FIG. 3 is a plan view showing the structure of the indirect-conversion-type of the radiation detection element 10 according to the present exemplary embodiment. Further, FIG. 4 is a cross-sectional view, taken along line A-A in FIG. 3, of a pixel 20A for radiographic imaging.

Figure 4:
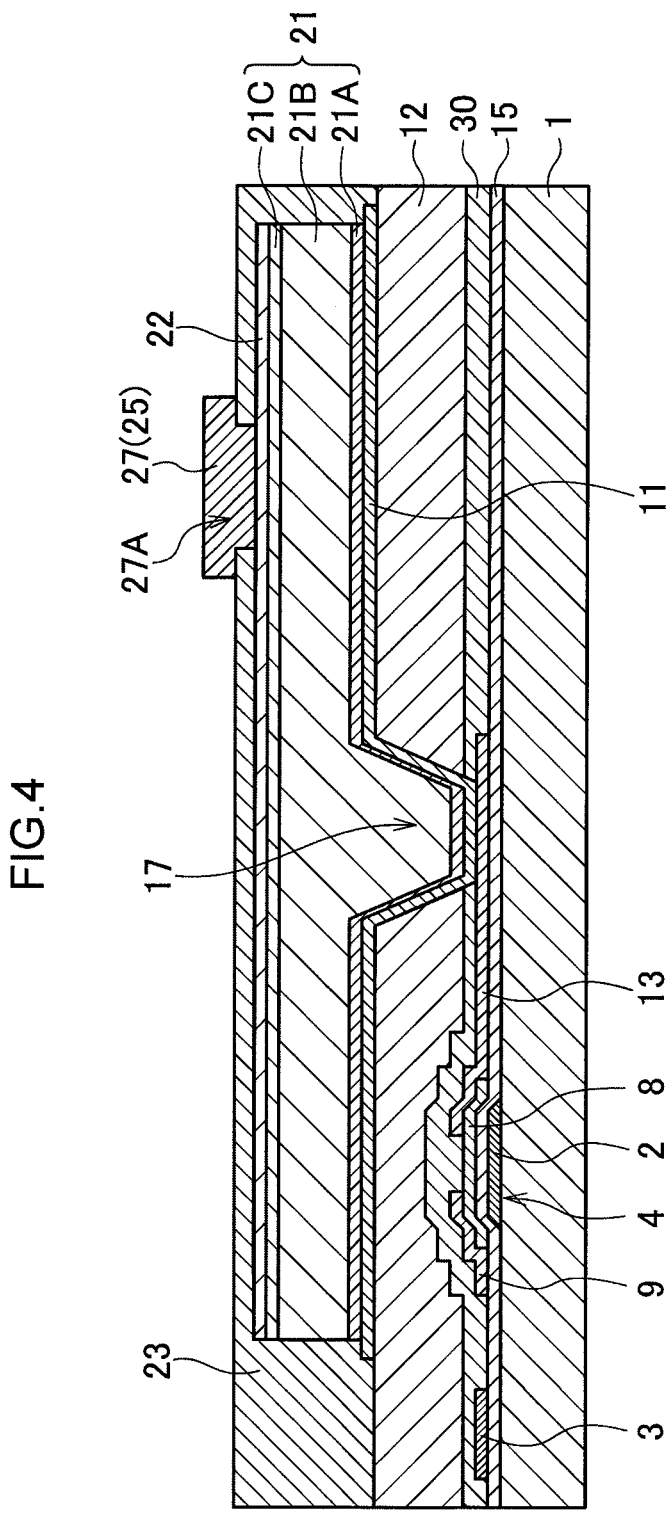
FIG. 4 is a cross-sectional view of the radiation detection element according to the first exemplary embodiment.

As shown in FIG. 4, in the pixels 20A of the radiation detection element 10, the scan lines 101 (see FIG. 3) and gate electrodes 2 are formed on an insulating substrate 1 comprising alkali-free glass or the like. The scan lines 101 and the gate electrodes 2 are connected to each other (see FIG. 3). The wiring layers in which the scan lines 101 and the gate electrodes 2 are formed (these wiring layers will be called "first signal line layers" below) are formed using Al or Cu or a layered film made mainly of Al or Cu. However, the material of the first signal line layers is not limited to these.

On the first signal line layers, an insulating film 15 is formed on whole surface. The portion of the insulating film 15 positioned above the gate electrodes 2 operates as gate insulating films in the TFT switches 4. The insulating film 15 comprises $SiN_x$, for example, and is formed by chemical vapor deposition (CVD) film formation, for example.

Semiconductor active layers 8 are formed in an island shape on the insulating film 15 over the gate electrodes 2. The semiconductor active layers 8 are channel portions of the TFT switches 4 and include amorphous silicon films, for example.

On top of these, source electrodes 9 and drain electrodes 13 are formed. In the wiring layers in which the source electrodes 9 and the drain electrodes 13 are formed, the signal lines 3 are formed. The source electrodes 9 are connected to the signal lines 3 (see FIG. 3). The wiring layers in which the source electrodes 9, the drain electrodes 13, and the signal lines 3 are formed (these wiring layers will be called "second signal line layers" below) are formed using Al or Cu or a layered film made mainly of Al or Cu. However, the material of the second signal line layers is not limited to these. An impurity-doped semiconductor layer (not shown in the drawings) formed of impurity-doped amorphous silicon or the like is formed between the source electrodes 9 and the semiconductor active layers 8 and between the drain electrodes 13 and the semiconductor active layers 8. According to the above, the TFT switches 4 for switching are configured. In the TFT switches 4, the source electrodes 9 and the drain electrodes 13 may be opposite due to the polarities of the charges that are collected and accumulated by lower electrodes 11.

Covering these second signal line layers, a TFT protective film layer 30 is formed, in order to protect the TFT switches 4 and the signal lines 3, on substantially the entire surface (substantially the entire region) of the region in which the pixels 20 are disposed on the substrate 1. The TFT protective film layer 30 comprises $SiN_x$, for example, and is formed by CVD film formation, for example.

A coated interlayer insulating film 12 is formed on the TFT protective film layer 30. The interlayer insulating film 12 is formed in a film thickness of 1 μm to 4 μm by a photosensitive organic material (e.g., a positive photosensitive acrylic resin: a material in which a naphthoquinone diazide positive photosensitizer is mixed together with a base polymer comprising a copolymer of methacrylic acid and glycidyl methacrylate) having a low permittivity (relative permittivity $\epsilon_r$=2 to 4).

In the radiation detection element 10 according to the present exemplary embodiment, the capacitance between metals placed on top of and under the interlayer insulating film 12 is kept low by the interlayer insulating film 12. Further, usually this material also has a function as a planarizing film and also may planarize the steps formed below. In the radiation detection element 10 according to the present exemplary embodiment, contact holes 17 are formed in positions in the interlayer insulating film 12 and the TFT protective film layer 30 opposing the drain electrodes 13.

Lower electrodes 11 of the sensor portions 103 are formed on the interlayer insulating film 12 in such a way as to cover the pixel regions while filling in the contact holes 17. The lower electrodes 11 are connected to the drain electrodes 13 of the TFT switches 4. The lower electrodes 11 have virtually no restrictions in their material as long as the material is conductive in a case where later-described semiconductor layers 21 are thick around 1 μm. For this reason, the lower electrodes 11 may be formed using a conductive metal such as an Al material or ITO.

On the other hand, in a case where the film thickness of the semiconductor layers 21 is thin (around 0.2 μm to 0.5 μm), light absorption may not be sufficient in the semiconductor layers 21. For this reason, in order to prevent an increase in leak current resulting from the application of the light to the TFT switches 4, it is preferable for the lower electrodes 11 to be formed using a layered film or an alloy made mainly of a light-blocking metal.

The semiconductor layers 21, which function as photodiodes, are formed on the lower electrodes 11. In the present exemplary embodiment, photodiodes with a PIN structure, in which an $n^+$ layer, an i layer, and a $p^+$ layer ($n^+$ amorphous silicon, amorphous silicon, and $p^+$ amorphous silicon) are layered, are employed as the semiconductor layers 21. The semiconductor layers 21 are formed by sequentially layering an $n^+$ layer 21A, an i layer 21B, and a $p^+$ layer 21C from the lower layer. The i layer 21B generates charges (a free electron and free hole pair) as a result of being light being applied to the i layer 21B. The $n^+$ layer 21A and the $p^+$ layer 21C function as contact layers, and electrically connect the i layer 21B to the lower electrode 11 and a later-described upper electrode 22.

Upper electrodes 22 are individually formed on each of the semiconductor layers 21. A material whose light transmittance is high, such as ITO or IZO (indium zinc oxide), for example, is used for the upper electrodes 22. In the radiation detection element 10 according to the present exemplary embodiment, the sensor portions 103 are configured to include the upper electrodes 22, the semiconductor layers 21, and the lower electrodes 11.

A coated interlayer insulating film 23 is formed on the interlayer insulating film 12, the semiconductor layers 21, and the upper electrodes 22 in such a way as to have openings 27A in parts corresponding to the upper electrodes 22 and in such a way as to cover each of the semiconductor layers 21.

The common electrode lines 25 are formed on the interlayer insulating film 23 by Al or Cu or by an alloy or a layered film made mainly of Al or Cu. Contact pads 27 are formed in the neighborhoods of the openings 27A, and the common electrode lines 25 are electrically connected to the upper electrodes 22 via the openings 27A in the interlayer insulating film 23.

On the radiation detection element 10 that has been formed in this way, a protective film is further formed, if necessary, by an insulating material whose light absorption is low, and a scintillator comprising GOS or the like is adhered on the surface of the protective film using an adhesive resin whose light absorption is low.

Figure 5:
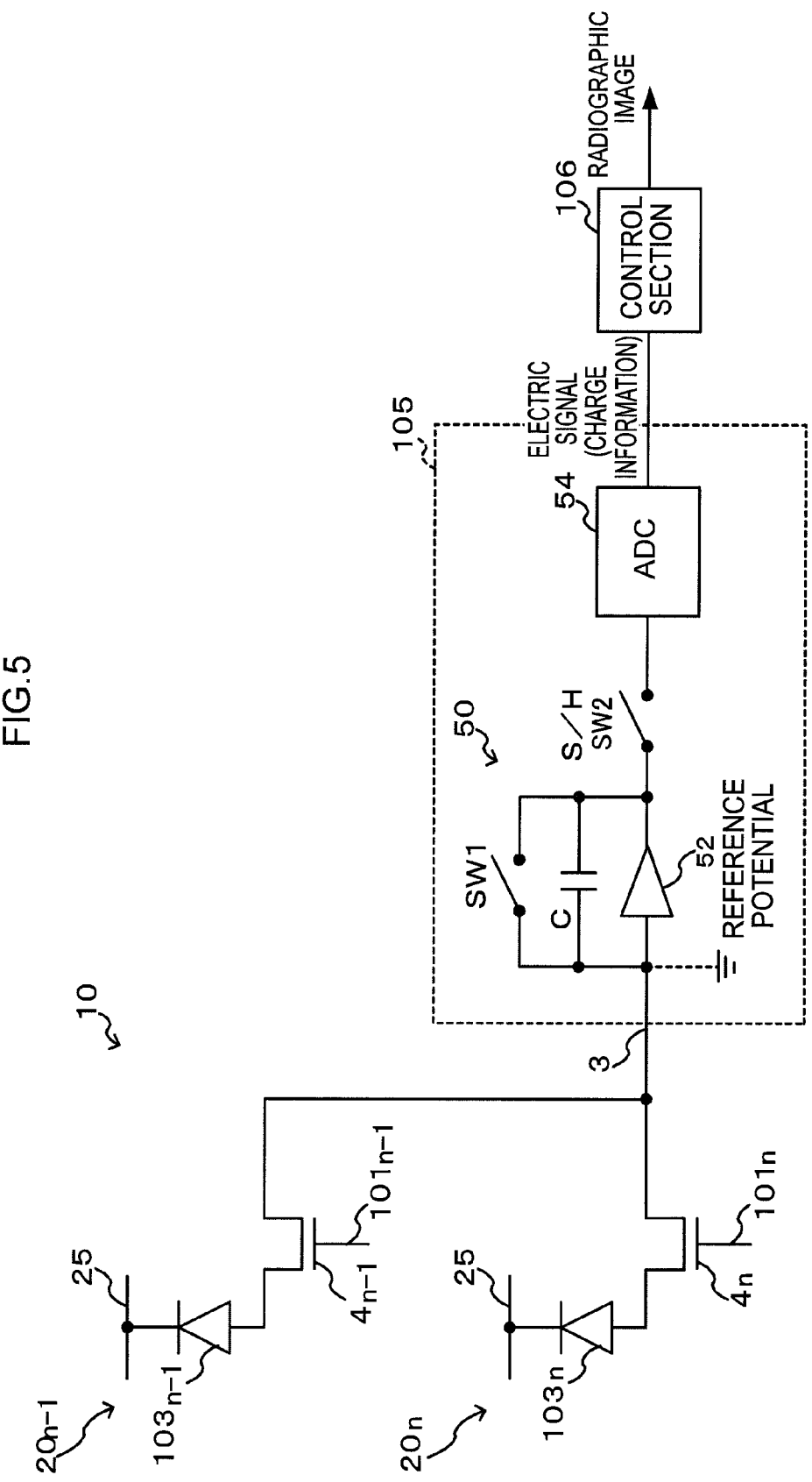
FIG. 5 is a schematic configuration diagram of a signal detection circuit of the radiographic imaging device according to the first exemplary embodiment.

Next, the schematic configuration of the signal detection circuit 105 of the present exemplary embodiment will be described. FIG. 5 is a schematic configuration diagram of an example of the signal detection circuit 105 of the present exemplary embodiment. The signal detection circuit 105 of the present exemplary embodiment is configured to include amplifier circuits 50 and an analog-to-digital converter (ADC) 54. Although it is not shown in FIG. 5, the amplifier circuits 50 are disposed for each signal line 3. That is, the signal detection circuit 105 is configured to include the same number of plural amplifier circuits 50 as the number of signal lines 3 in the radiation detection element 10.

Each of the amplifier circuits 50 is configured by a charge amplifier circuit and is configured to include an amp 52, a capacitor C, and a switch SW1. The amp 52 is an op-amp or the like, that amplifies the charges on the basis of a reference potential. The capacitor C is connected in parallel to the amp 52. The switch SW1 is connected in parallel to the amp 52 and is for charge resetting.

In the amplifier circuits 50, the charges (electric signals) are read out by the TFT switches 4 of the pixels 20 when the charge resetting switches SW1 are OFF, and the charges that have been read out by the TFT switches 4 are accumulated in the capacitors C. In the amplifier circuits 50, the voltage values outputted from the amps 52 increase (rise) in accordance with the accumulated charge quantities.

Further, the control section 106 applies a charge reset signal to the charge resetting switches SW1 and controls the ON/OFF of the charge resetting switches SW1. When the charge resetting switches SW1 are switched to an ON state, the input sides and the output sides of the amps 52 are short-circuited and the charges in the capacitors C are discharged. Because of this, the charges in the amps 52 are reset (in the present exemplary embodiment, reset to a ground level).

The ADC 54 converts the electric signals that are analog signals that have been inputted thereto from the amplifier circuits 50, when sample-and-hold (S/H) switches SW2 are ON, into digital signals. The ADC 54 sequentially outputs the electric signals it has converted into digital signals to the control section 106.

The electric signals that have been outputted from all of the amplifier circuits 50 are inputted to the ADC 54 of the present exemplary embodiment. That is, the signal detection circuit 105 of the present exemplary embodiment is equipped with one ADC 54 regardless of the number of the amplifier circuits 50 (the signal lines 3).

The control section 106 of the present exemplary embodiment controls the ON/OFF timing of the TFT switches 4 when reading the charges information for a radiographic image from the signal detection circuit 105 (the ADC 54) and generating image data of a radiographic image that has been imaged. Because of this, the control section 106 of the present exemplary embodiment may suppress feed-through without narrowing a dynamic range.

Figure 6:
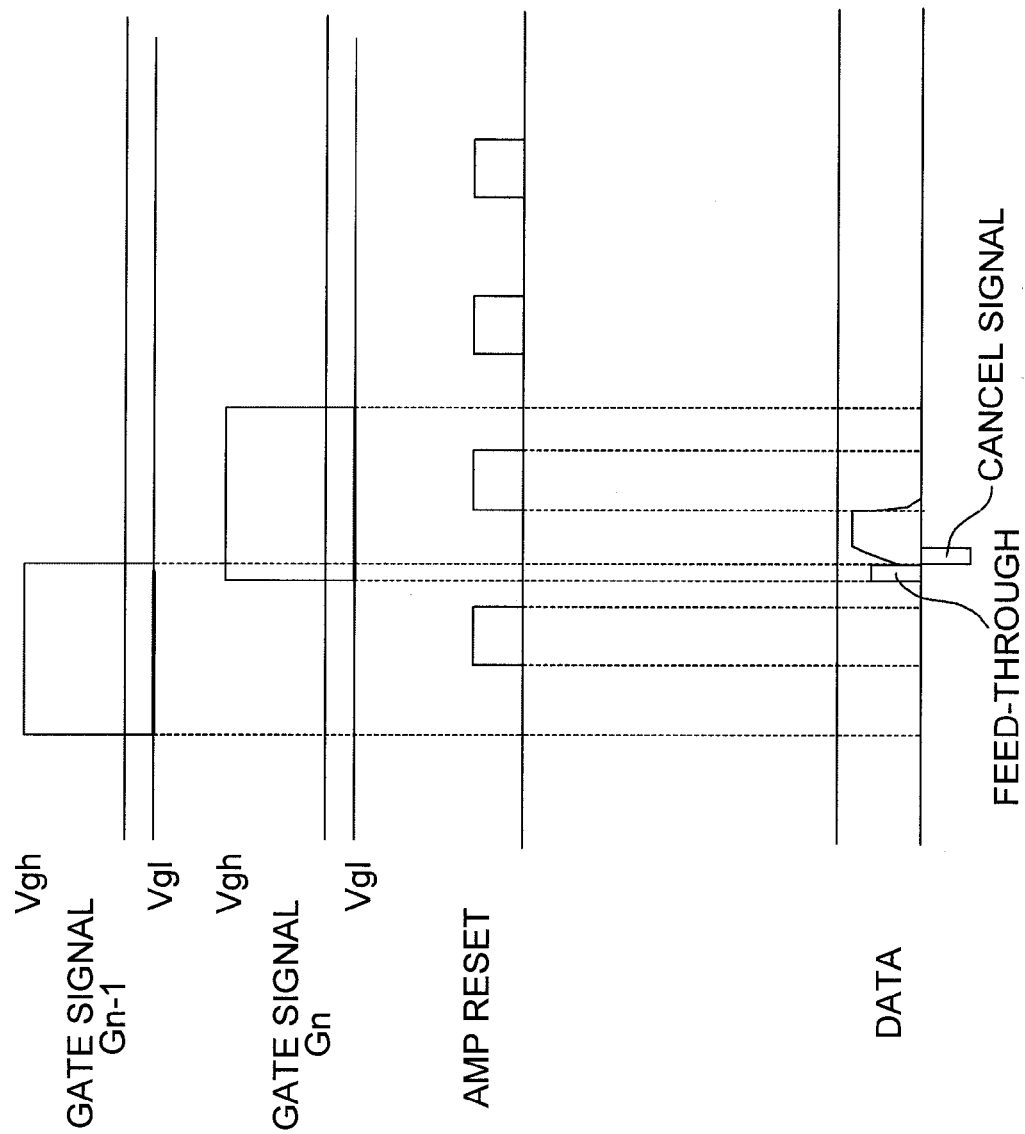
FIG. 6 is a time chart showing a flow of imaging a radiographic image in the radiographic imaging device according to the first exemplary embodiment.
Figure 7:
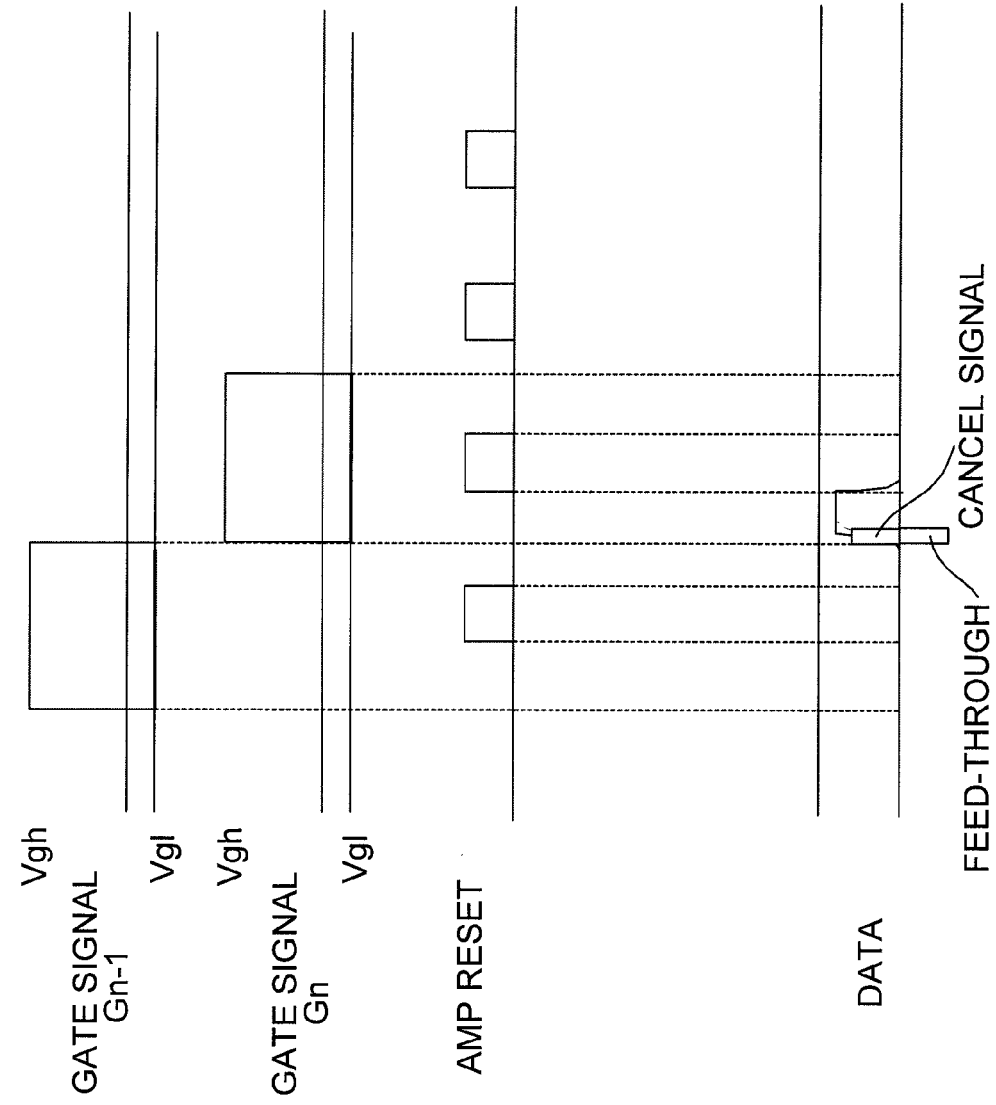
FIG. 7 is a time chart showing a flow of imaging a radiographic image in the radiographic imaging device according to the first exemplary embodiment.
Figure 9:
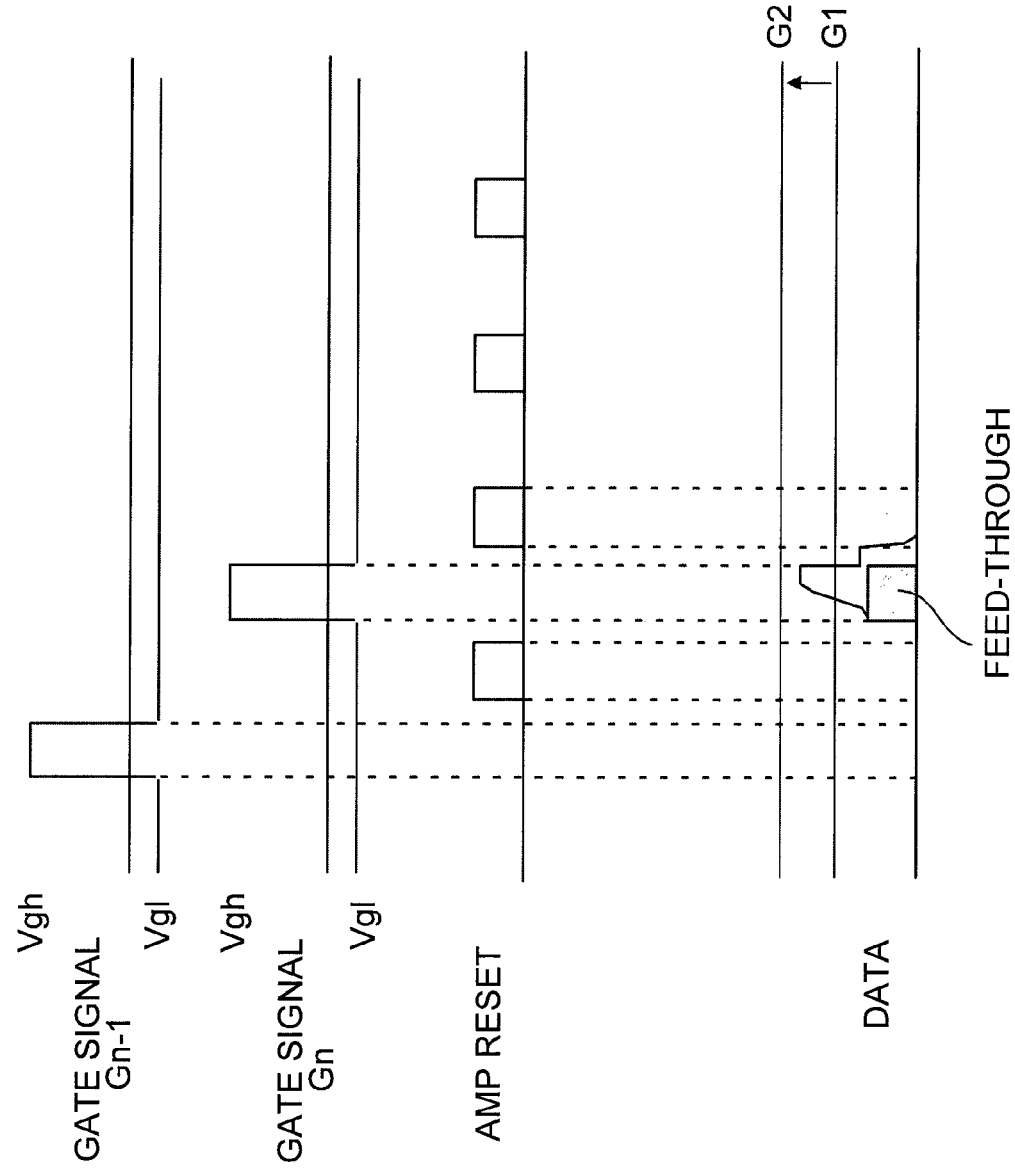
FIG. 9 is a time chart showing an example of a flow of a conventional radiographic imaging device.

Next, an operation for controlling the ON/OFF timing of the TFT switches 4 when the control section 106 of the radiographic imaging device 100 of the above-described configuration generates image data of a radiographic image will be described with reference to FIG. 6, FIG. 7 and FIG. 9. FIG. 6 and FIG. 7 are time charts showing examples of flows of operations when imaging a radiographic image. In the radiographic imaging device 100 of the present exemplary embodiment, each operation when imaging a radiographic image is performed in each row of the pixels 20 (in each of the scan lines 101). Further, FIG. 9 is a time chart showing, as a comparative example, an example of a flow of operations in the conventional radiographic imaging device exemplified as described above.

When the radiation is applied from the radiation irradiation device 204, the irradiated radiation is absorbed by the scintillator and is converted into visible light. The radiation may be applied from either the front side or the back side of the radiation detection element 10. The visible light into which the radiation has been converted by the scintillator is illuminated to the sensor portions 103 of the pixels 20.

Charges are generated inside the sensor portions 103 when the light is illuminated to the sensor portions 103. The generated charges are collected by the lower electrodes 11, whereby the charges (signal charges) in the sensor portions 103 increase.

In order to read the charges from the pixels 20 (a pixel $20n-1$), a gate signal $Gn-1$ of the TFT switch 4 becomes Vgh. Next, in the pixel $20n-1$ in one row connected to the scan line 101 to which the gate signal $Gn-1$ is inputted, the TFT switch 4 (a TFT switch $4n-1$) is switched to an ON state, and the charges that have been accumulated in the sensor portion 103 are read out and are accumulated in the capacitor C of the amplifier circuit 50.

In the present exemplary embodiment, after a predetermined time period sufficient for reading out the charges from the sensor portions 103 has elapsed, the charge resetting switches SW1 of the amplifier circuits 50 are switched ON (see "amp reset" in FIG. 6) for a predetermined period to discharges (reset) the charges that have been accumulated in the capacitors C of the amplifier circuits 50.

The radiographic imaging device 100 of the present exemplary embodiment has a configuration where the plural scan lines 101 for switching the TFT switches 4 ON/OFF and the plural signal lines 3 for transmitting the signal charges from the pixels 20 whose switching elements 4 have been switched ON are arranged intersecting each other. Consequently, when reading the charges from a pixel 20n, at the time when the switching element 4 is ON and at the time when the switching element 4 is OFF, the voltage applied to the parasitic capacitance existing in the position, where the signal line 3 intersects the scan line 101 connected to that switching element 4, changes. Due thereto, feed-through (see FIG. 6 and FIG. 7) may be superimposed on the signal charges transmitted through the signal line 3.

For that reason, in the radiographic imaging device 100 of the present exemplary embodiment, after the resetting of the amplifier circuits 50 (the amps 52), the time period in which the TFT switch 4n−1 of the pixel 20n−1 is ON ends (the TFT switch 4n−1 is switched to OFF) and the TFT switch 4n of the pixel 20n is switched ON (a time period in which the TFT switch 4n is ON is started). It is preferable for the timing when the TFT switch 4n−1 is switched OFF and the timing when the TFT switch 4n is switched ON to be the same timing as shown in FIG. 7. Further, as shown in FIG. 6, if the time periods in which the timing when the TFT switch 4n−1 is switched OFF and the timing when the TFT switch 4n is switched ON, can be regarded as substantially simultaneous, the time period in which the TFT switch 4n is ON and the time period in which the TFT switch 4n−1 is ON may also overlap, namely, portions of both time periods may overlap.

Here, T denotes a time period in which the timing when the TFT switch 4n−1 is switched OFF and the time period in which the TFT switch 4n is ON overlap. In order to end the operation of canceling the feed-through component, before the read-out of the charges Q by the TFT switch 4n advances, it suffices for the time period T to be a range that is larger than a delay time τg of the scan line 101n connected to the TFT switch Tn, and smaller than a switching delay time τtft of the TFT switch 4n.

The delay time τg of the scan line 101n connected to the TFT switch 4n may be given by the following expression (1) when Cg denotes the line capacitance of the scan line 101n and Rg denotes the line resistance of the scan line 101n.

$$\tau g = Cg \times Rg \quad (1)$$

Further, the switching delay time τtft of the TFT switch 4n may be given by the following expression (2) when Cpd denotes the capacitance of the detection pixel 20n (photodiode capacitance Cpd+TFT switch 4 capacitance Ctft≈Cpd) and Ron denotes the ON-resistance of the TFT switch 4n.

$$\tau tft = Cpd \times Ron \quad (2)$$

Consequently, the range of the time period T may be a range that satisfies the following relational expression (3).

$$\tau g < T < \tau tft \quad (3)$$

Further, the size of the TFT switch 4n may be formed in such a way that the relationship in the following expression (4) to be true.

$$Cg \times Rg < Cpd \times Ron \quad (4)$$

Usually, the line capacitance Cg is several hundred pF, the line resistance Rg is several kΩ, the capacitance Cpd is several pF, and the ON-resistance Ron is several MΩ. Consequently, becomes 0.several μs<T<several μs. For example, if the line capacitance Cg=100 pF, the line resistance Rg=10 kΩ, the capacitance Cpd=2 pF, and the ON-resistance Ron=5 MΩ, then the delay time τg=1 μs because of expression (1) and the switching delay time τtft=10 μs because of expression (2). Consequently, the time period T shall be set to 1 to 10 μs because of expression (3).

More preferably, the canceling of feed-through at the former stage and the latter stage should be completed before the charges Q from the pixel 20n flow out to the signal line 3 (before about 50% of the switching delay time τtft). That is, a range that satisfies the following relational expression (5) is preferable.

$$\tau g < T < \tau tft \times 0.5 \quad (5)$$

By applying the above-described example to expression (5), time period T becomes 1 to 5 μs.

Further, in the above-described example, the delay time τg becomes sufficiently smaller than the switching delay time τtft. For this reason, before the read-out of the charges Q, the operation of canceling the feed-through component may be completed. Consequently, in the above-described example, the dynamic range of the amps 52 may be enlarged.

Feed-through occurs when the TFT switches 4 have been switched ON, but because the TFT switch 4n−1 is OFF, signals (cancel signals) whose level is the same as the inverse of the feed-through may be generated. For this reason, the feed-through component may be canceled by making the time period in which the TFT switch 4n is ON and the time period in which the TFT switch 4n−1 is ON substantially the same time periods.

Accordingly, feed-through may be kept from being superimposed on the signal charges Qn that have been read out from the pixel 20n. Consequently, the gain of the amplifier circuits 50 (amps 52) may be set in consideration of the signal charges (see G1 in FIG. 6 and FIG. 7), and the dynamic range of the amplifier circuits 50 (amps 52) may be effectively utilized.

On the other hand, in the conventional radiographic imaging device shown in FIG. 9, the amp is reset after the gate signals Gn−1 becomes OFF (Vgl), and the gate signals Gn becomes ON (Vgh) after the resetting ends. Accordingly, the feed-through component that occurs after the gate signals Gn becomes ON is not canceled, and may ends up being superimposed on the signal charges Qn that is read out as a result of the gate signals Gn becoming ON. Consequently, the total charges quantity increases, the gain setting raises to G2 from G1, which is the gain setting of the present exemplary embodiment as shown in FIG. 6 and FIG. 7, and the dynamic range of the amp becomes narrower. Namely, the dynamic range becomes narrower by the charge quantity corresponding to the superimposed feed-through component.

As described above, in the radiographic imaging device 100 of the present exemplary embodiment, the control section 106 performs control so that the timing when the TFT switch 4n−1 of the pixel 20n is switched OFF and the timing when the TFT switch 4n of the pixel 20n is switched ON become simultaneous timings. Further, in the radiographic imaging device 100 of the present exemplary embodiment, the control section 106 performs control so that the timing when the TFT switch 4n−1 of the pixel 20n−1 is switched OFF and the timing when the TFT switch 4n of the pixel 20n is switched ON become timings that can be regarded as substantially simultaneous, even though portions of the time period in which the TFT switch 4n is ON and the time period in which the TFT switch 4n−1 is ON overlap. For this reason, the radiographic imaging device 100 of the present exemplary embodiment outputs the control signals G via the scan lines 101 to the gates of the TFT switches 4.

Accordingly, the radiographic imaging device 100 of the present exemplary embodiment may cancel, with the cancel signals generated by switching the TFT switch 4n-1 of the pixel 20n to an OFF state, the feed-through component generated by switching the TFT switch 4n of the pixel 20b to an ON state. Accordingly, in the radiographic imaging device 100 of the present exemplary embodiment, the feed-through component is immediately canceled. Consequently, in the radiographic imaging device 100 of the present exemplary embodiment, the feed-through component may not be superimposed on the signal charges Qn and the dynamic range may be suppressed from becoming narrower.

Second Exemplary Embodiment

Next, the second exemplary embodiment of the present invention will be described. Noted that the configurations and the operations similar to those in the radiographic imaging device 100 of the first exemplary embodiment will be given with the same references, and description thereof will be omitted.

Figure 8:
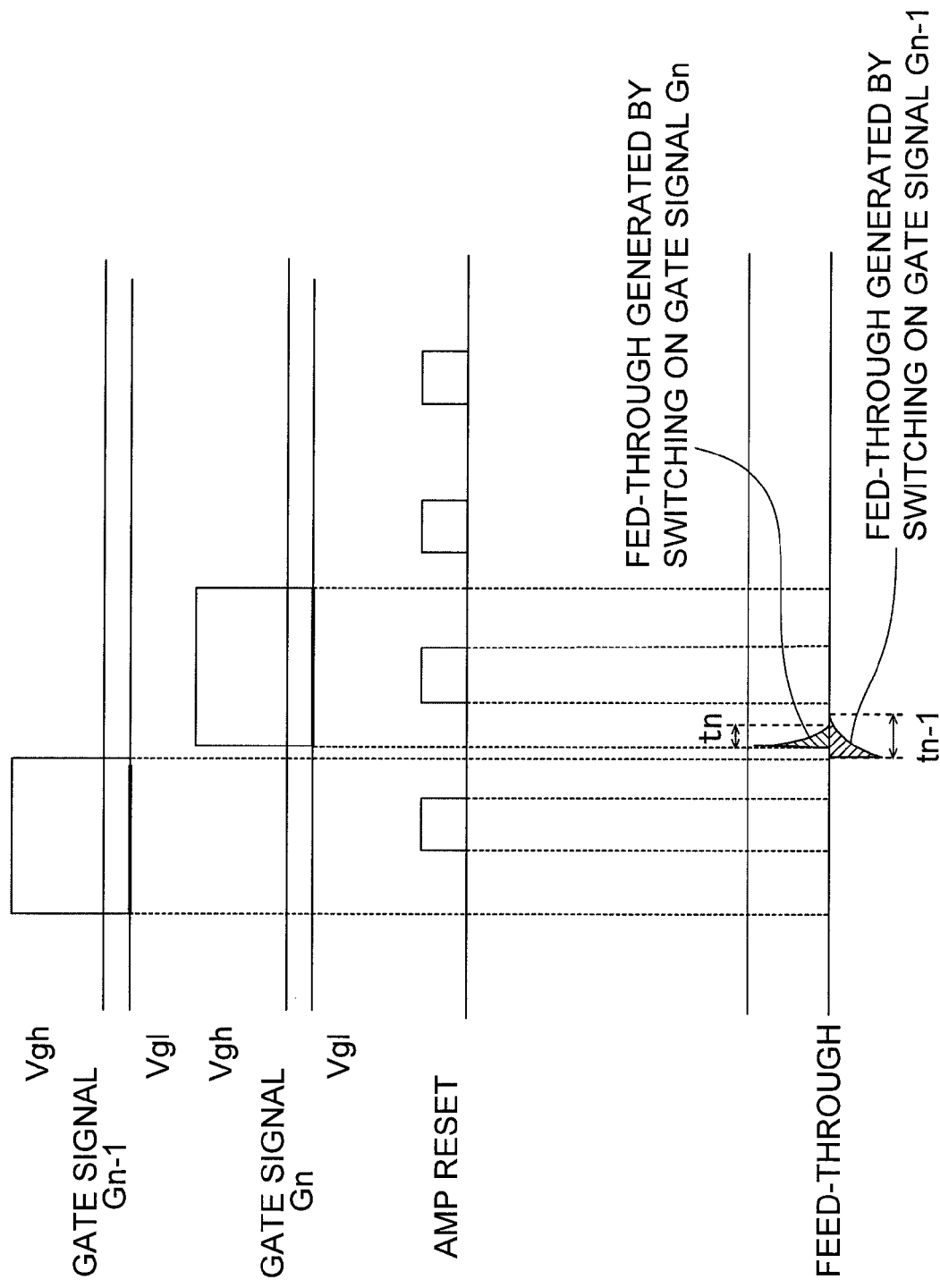
FIG. 8 is a time chart showing a flow of imaging a radiographic image in the radiographic imaging device according to a second exemplary embodiment.

Hereinafter, the feed-through noise that occurs in the radiographic imaging device 100 of the present exemplary embodiment will be described with reference to FIG. 8. FIG. 8 is a time chart showing a flow of imaging a radiographic image in the radiographic imaging device according to a second exemplary embodiment.

When the TFT switch 4n-1 of the pixel 20n-1 is switched OFF (namely, when the gate signal decay), the voltage applied to the parasitic capacitance changes. Due to this change, inductive charge (feed-through noise) occurs in the parasitic capacitance. This feed-through noise includes a negative characteristic, as shown in FIG. 8. On the other hand, when the TFT switch 4n of the pixel 20n is switched ON (namely, when the gate signal rises), the voltage applied to the parasitic capacitance changes. Due to this change, inductive charge (feed-through noise) occurs in the parasitic capacitance. This feed-through noise includes a positive characteristic, as shown in FIG. 8. Note that the both feed-through noises have the same absolute amount of charges (namely, the square measure of the both feed-through noises shown with slanting lines in FIG. 8 are the same).

As described above, the both feed-through noises have different polarity and have the same charge amounts (total energy amounts). Accordingly, in the radiographic imaging device 100 of the present exemplary embodiment, the control signal G is outputted such that the feed-through noise generated due to switching ON the TFT 4n is canceled by the feed-through noise generated due to switching OFF the TFT 4n-1.

Namely, the radiographic imaging device 100 of the present exemplary embodiment controls the ON and OFF of the TFT switches 4 such that a generation period tn, in which feed-through noise is generated due to switching ON the TFT 4n, is included within a generation period tn-1, in which feed-through noise is generated due to switching OFF the TFT 4n-1.

Note that the generation periods of the feed-through noises (generation period tn and generation period tn-1) may not be the entire period (from start of the generation to end of the generation) in which the feed-through noises are generated, and may be a period in which a predetermined amount of feed-through noises (charges) are generated. The generation period of the feed-through noises may be obtained beforehand by, for example, experiments, and the like.

As shown in FIG. 8, the generation period tn-1 is delayed from the timing in which the TFT switch 4n-1 is switched OFF. Further, the generation period tn is delayed from the timing in which the TFT switch 4n is switched ON. In the radiographic imaging device 100 of the present exemplary embodiment, since the control signals G are outputted to include the generation period tn within the generation period tn-1, the TFT switch 4n is turned ON after elapse of a predetermined period from the timing when the TFT switch 4n-1 is turned OFF.

As shown in FIG. 8, it is preferable to include the generation period tn within the generation period tn-1, however not the entire period but a portion of the generation period tn may be included within the generation period tn-1. If at least a portion of the generation period tn-1 and the generation period tn overlaps, the feed-through component may be canceled within the signal line. Note that, when a portion of the generation period tn-1 and the generation period tn overlaps, it is preferable for the portion to be determined based on the amount of the feed-through noise and the dynamic range, since the feed-through noise that has been generated outer the overlapping portion of the generation periods may superimpose on the signals.

As described in the above exemplary embodiments, the radiographic imaging device 100 may cancel the feed-through component (noise) generated due to switching ON the TFT switch 4n of the pixel 20n by the cancel signal or the feed-through noise generated due to switching OFF the TFT switch 4n-1 of the pixel 20n-1. Accordingly, in the radiographic imaging device 100 of the above exemplary embodiments, the feed-through component is immediately canceled. Consequently, in the radiographic imaging device 100 of the above exemplary embodiments, the feed-through component may not be superimposed on the signal charges Qn and the dynamic range may be suppressed from becoming narrower.

Further, in the radiographic imaging device 100 of the above exemplary embodiments, it is not necessary to use a dedicated adjusting section, and therefore it is not necessary to dispose a dedicated circuit or the like, and correction is possible in the neighborhoods of target sites (the pixels 20) where cancellation of the feed-through component is desired. For this reason, the radiographic imaging device 100 of the above exemplary embodiments may appropriately perform suppression of the feed-through component without being affected by in-plane variations in the TFT 4.

Note that, in the above exemplary embodiments, a case in which adjacent pixels 20 are used to cancel the feed-through component has been described. However, the present invention is not limited thereto. For example, pixels 20 that are connected to the same signal line 3, and that can be controlled with the timing to drive the TFT switch 4 as in the manner described above, may be used instead of adjacent pixels 20. Characteristic difference between the elements (for example, the sensor portion 103, the TFT switch 4, and the like) that configure the adjacent pixels 20 or nearby pixels 20, may be in a small level that may be ignored. However, the characteristic difference between the pixels may not be ignored when the distance between the pixels spreads. Accordingly, in order to cancel the feed-through component, it is preferable to use the pixels 20 nearby, especially the adjacent pixels 20, to cancel the feed-through component. Namely, it is preferable to prevent (cancel) the feed-through component by controlling the TFT switches 4 that are connected to adjacent scan lines 101.

Note that, it is preferable to provide plural dummy scan lines 101 in the radiographic imaging device 100. By outputting the control signal G to the dummy scan lines 101, as in the same manner as driving the TFT switches 4, the feed-through component generated by switching ON the TFT switch 4 of the pixel 20 in the row, in which the charges are read out first, may be canceled. Further, similarly, by outputting the control signal G to the dummy scan lines 101, the feed-through component generated by switching OFF the TFT switch 4 of the pixel 20 in the row, in which the charges are read out last, may be canceled.

Note that, in the above exemplary embodiments, a case in which the present invention is applied to an indirect-conversion-type of the radiation detection element 10, has been described. However, the present invention may be applied to a direct-conversion-type radiation detection element 10 that directly converts radiation such as X-rays into charges. In such case, the direct-conversion-type radiation detection element 10 generates charges due to irradiation of radiation.

The configurations, operations, and so forth of the radiographic imaging device 100, the radiation detection element 10, and so forth described in the above exemplary embodiments are examples and, can be changed depending on the situation in a scope not departing from the gist of the present invention.

Further, in the above exemplary embodiments, the radiation of the present invention is not particularly limited, and X-rays, gamma rays, and so forth can be applied.

Furthermore, the configurations of the pixels 20 are not limited to the above exemplary embodiments. As an example, in the above exemplary embodiments, in a case in which a rectangle shape is applied as a configuration of the pixels 20 have been described. However other configurations may be applied to the pixels 20. Further, positions of the pixels 20 are not limited to the above exemplary embodiments, as long as the pixels 20 are positioned at the intersecting portions of the scan lines 101 and the signal lines 3. For example, in the above exemplary embodiments, as shown in FIG. 2, a case in which the pixels 20 having a rectangle shape arranged two dimensionally with regularity, have been described. However, the present invention is not limited thereto, and any shape may be applied unless the pixels 20 are arranged two dimensionally with regularity.

What is claimed is:

1. A radiographic imaging device comprising:
   a plurality of pixels arranged in a matrix, each pixel including
      a photoelectric conversion element that generates charges due to irradiation of radiation, and
      a switching element that reads out the charges, and outputs electric signals that correspond to the generated charges to a signal line;
   amplifying sections that accumulate charges corresponding to the electric signals, and outputs amplified electric signals in which the charges that have been accumulated are amplified; and
   a control section that outputs, to a control line, control signals that control time periods in which the electric signals are outputted from the switching elements,
   wherein the control section outputs the control signals such that a first time period, in which the switching element of a first pixel is driven to output the electric signals, and part of a second time period, in which the switching element of a second pixel driven after the switching element of the first pixel outputs the electric signals, overlap, or the control section outputs the control signals such that an end of the first time period and the start of a second time period overlaps, and
   wherein, when Ron denotes the ON-resistance of the switching elements, Cpd denotes the pixel capacitance of the pixels including the switching elements, Rg denotes the line resistance of the control line, and Cg denotes the line capacitance of the control line, the control section outputs the control signals such that a time period T in which the first time period and part of the second time period overlaps satisfies the relationship of $Cg \times Rg < T < Cpd \times Ron$.

2. The radiographic imaging device according to claim 1, further comprising a reset section that resets the charges that have been accumulated in the amplifying section,
   wherein the control section outputs the control signals such that the first time period of the first pixel ends and the second time period of the second pixel starts, after the reset section has reset the charges of the first pixel that has been accumulated in the amplifying section.

3. The radiographic imaging device according to claim 1, wherein the first pixel and the second pixel are adjacent pixels.

4. The radiographic imaging device according to claim 1, wherein, when Ron denotes the ON-resistance of the switching elements, Cpd denotes the pixel capacitance of the pixels including the switching elements, Rg denotes the line resistance of the control line, and Cg denotes the line capacitance of the control line, the relationship of $Cg \times Rg < Cpd \times Ron$ is satisfied.

5. A radiographic imaging device comprising:
   a plurality of pixels arranged in a matrix, each pixel including
      a photoelectric conversion element that generates charges due to irradiation of radiation, and
      a switching element that reads out the charges, and outputs electric signals that correspond to the generated charges to a signal line;
   amplifying sections that accumulate charges corresponding to the electric signals, and outputs amplified electric signals in which the charges that have been accumulated are amplified; and
   a control section that outputs, to a control line, control signals that control time periods in which the electric signals are outputted from the switching elements,
   wherein the control section outputs the control signals such that a first generation period predetermined based on a charge amount of feed-through noise generated due to switching OFF the switching element of a first pixel, and a second generation period predetermined based on a charge amount of the feed-through noise generated due to switching ON the switching element of a second pixel, driven after the switching element of the first pixel, overlaps.

6. The radiographic imaging device according to claim 5, wherein the control section outputs the control signals such that the second generation period is included in the first generation period.

7. A non-transitory computer-readable medium storing a program for causing a computer to execute a process for controlling a radiographic imaging device including,
   a plurality of pixels arranged in a matrix, each pixel including a photoelectric conversion element that generates charges due to irradiation of radiation, and a switching element that read-out the charges and outputs electric signals corresponding to the charges to a signal line,
   amplifying sections that accumulate the charges corresponding to the electric signals and outputs amplified electric signals in which the charges that have been accumulated in the amplifying section are amplified, and a control line in which flows control signals that control time periods in which the electric signals are outputted from the switching elements, the processing comprising:

outputting the control signals such that a first time period, in which the switching element of a first pixel is driven to output the electric signals, and part of a second time period, in which the switching element of a second pixel driven after the switching element of the first pixel outputs the electric signals, overlap, or outputting the control signals such that the end of the first time period and the start of the second time period overlap;

wherein, when Ron denotes the ON-resistance of the switching elements, Cpd denotes the pixel capacitance of the pixels including the switching elements, Rg denotes the line resistance of the control line, and Cg denotes the line capacitance of the control line, the control section outputs the control signals such that a time period T in which the first time period and part of the second time period overlaps satisfies the relationship of $Cg \times Rg < T < Cpd \times Ron$.

8. A method for controlling a radiographic imaging device including a plurality of pixels arranged in a matrix, each pixel including a photoelectric conversion element that generates charges due to irradiation of radiation, and a switching element that read-out the charges and outputs electric signals corresponding to the charges to a signal line, amplifying sections that accumulate the charges corresponding to the electric signals and outputs amplified electric signals in which the charges that have been accumulated in the amplifying section are amplified, and a control line in which flows control signals that control time periods in which the electric signals are outputted from the switching elements, the method comprising:

outputting the control signals such that a first time period, in which the switching element of a first pixel is driven to output the electric signals, and part of a second time period, in which the switching element of a second pixel driven after the switching element of the first pixel outputs the electric signals, overlap, or outputting the control signals such that the end of the first time period and the start of the second time period overlap;

wherein, when Ron denotes the ON-resistance of the switching elements, Cpd denotes the pixel capacitance of the pixels including the switching elements, Rg denotes the line resistance of the control line, and Cg denotes the line capacitance of the control line, the control section outputs the control signals such that a time period T in which the first time period and part of the second time period overlaps satisfies the relationship of $Cg \times Rg < T < Cpd \times Ron$.

* * * * *